(12) United States Patent
Harper

(10) Patent No.: US 9,308,484 B1
(45) Date of Patent: Apr. 12, 2016

(54) ENVIRONMENTAL AIR FILTER SYSTEM

(71) Applicant: Clark N. Harper, Draper, UT (US)

(72) Inventor: Clark N. Harper, Draper, UT (US)

( * ) Notice: Subject to any disclaimer, the term of this patent is extended or adjusted under 35 U.S.C. 154(b) by 128 days.

(21) Appl. No.: 14/294,470

(22) Filed: Jun. 3, 2014

(51) Int. Cl.
*B01D 46/46* (2006.01)
*B60H 3/06* (2006.01)
*B01D 46/44* (2006.01)
*B01D 46/00* (2006.01)

(52) U.S. Cl.
CPC ............ *B01D 46/44* (2013.01); *B01D 46/0023* (2013.01); *B01D 46/46* (2013.01); *B60H 3/0608* (2013.01); *B01D 46/008* (2013.01)

(58) Field of Classification Search
CPC .. B01D 46/46; B01D 46/008; B01D 46/0023; B01D 46/2411; B60H 1/00378; B60H 3/0625
USPC ........... 55/385.1, 385.2, 385.3, 473, DIG. 34; 96/417, 422, 423; 454/158
See application file for complete search history.

(56) References Cited

U.S. PATENT DOCUMENTS

| | | | |
|---|---|---|---|
| 4,581,988 A * | 4/1986 | Mattei | B60H 1/00378 454/70 |
| 5,509,853 A | 4/1996 | Wells | |
| 5,676,913 A | 10/1997 | Cirillo | |
| 5,788,930 A | 8/1998 | McMurray | |
| 5,810,896 A | 9/1998 | Clemens | |
| 5,810,908 A * | 9/1998 | Gray | B01D 46/46 55/DIG. 34 |
| 5,954,577 A * | 9/1999 | Meckler | B60H 3/0625 454/158 |
| D416,320 S | 11/1999 | Prosper | |
| 6,569,393 B1 | 5/2003 | Hoke | |
| 6,660,070 B2 * | 12/2003 | Chung | B01D 46/008 55/385.2 |
| 6,800,119 B2 | 10/2004 | Huang | |
| 7,080,505 B2 | 7/2006 | Koermer | |
| 7,833,305 B1 * | 11/2010 | Studer | B01D 46/2411 55/385.1 |
| 2004/0031248 A1 * | 2/2004 | Lindsay | B01D 46/0023 55/385.3 |

FOREIGN PATENT DOCUMENTS

| | | |
|---|---|---|
| JP | 2005211833 | 8/2005 |
| TW | 201315949 | 4/2013 |

* cited by examiner

*Primary Examiner* — Duane Smith
*Assistant Examiner* — Minh-Chau Pham
(74) *Attorney, Agent, or Firm* — Kyle A. Fletcher, Esq.

(57) ABSTRACT

The environmental air filtration assembly includes a housing that may be coupled to the vehicle. The housing is exposed to ambient air. A filter is coupled to the housing. The filter removes pollutants from the ambient air. A processor is coupled to the housing. A motor is coupled to the housing and the processor. A fan is operationally coupled to the motor. The motor moves the fan so the fan urges the ambient air through the filter. A sensor is coupled to the housing. The sensor is operationally coupled to the processor. The sensor detects a speed of the vehicle. The sensor modifies a speed of the motor to correspond to the speed of the vehicle.

20 Claims, 8 Drawing Sheets

ENVIRONMENTAL AIR FILTER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of air filters, more specifically, environmental air filter system.

SUMMARY OF THE INVENTION

An embodiment of the disclosure meets the needs presented above by generally comprising a housing that may be coupled to the vehicle. The housing is exposed to ambient air. A filter is coupled to the housing. The filter removes pollutants from the ambient air. A processor is coupled to the housing. A motor is coupled to the housing and the processor. A fan is operationally coupled to the motor. The motor moves the fan so the fan urges the ambient air through the filter. A sensor is coupled to the housing. The sensor is operationally coupled to the processor. The sensor detects a speed of the vehicle. The sensor modifies a speed of the motor to correspond to the speed of the vehicle.

An object of the invention is to provide a device that is environmental air filter system.

These together with additional objects, features and advantages of the environmental air filter system will be readily apparent to those of ordinary skill in the art upon reading the following detailed description of presently preferred, but nonetheless illustrative, embodiments of the environmental air filter system when taken in conjunction with the accompanying drawings.

In this respect, before explaining the current embodiments of the environmental air filter system in detail, it is to be understood that the environmental air filter system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of environmental air filter system.

It is therefore important that the claims be regarded as including such equivalent construction insofar as they do not depart from the spirit and scope of environmental air filter system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
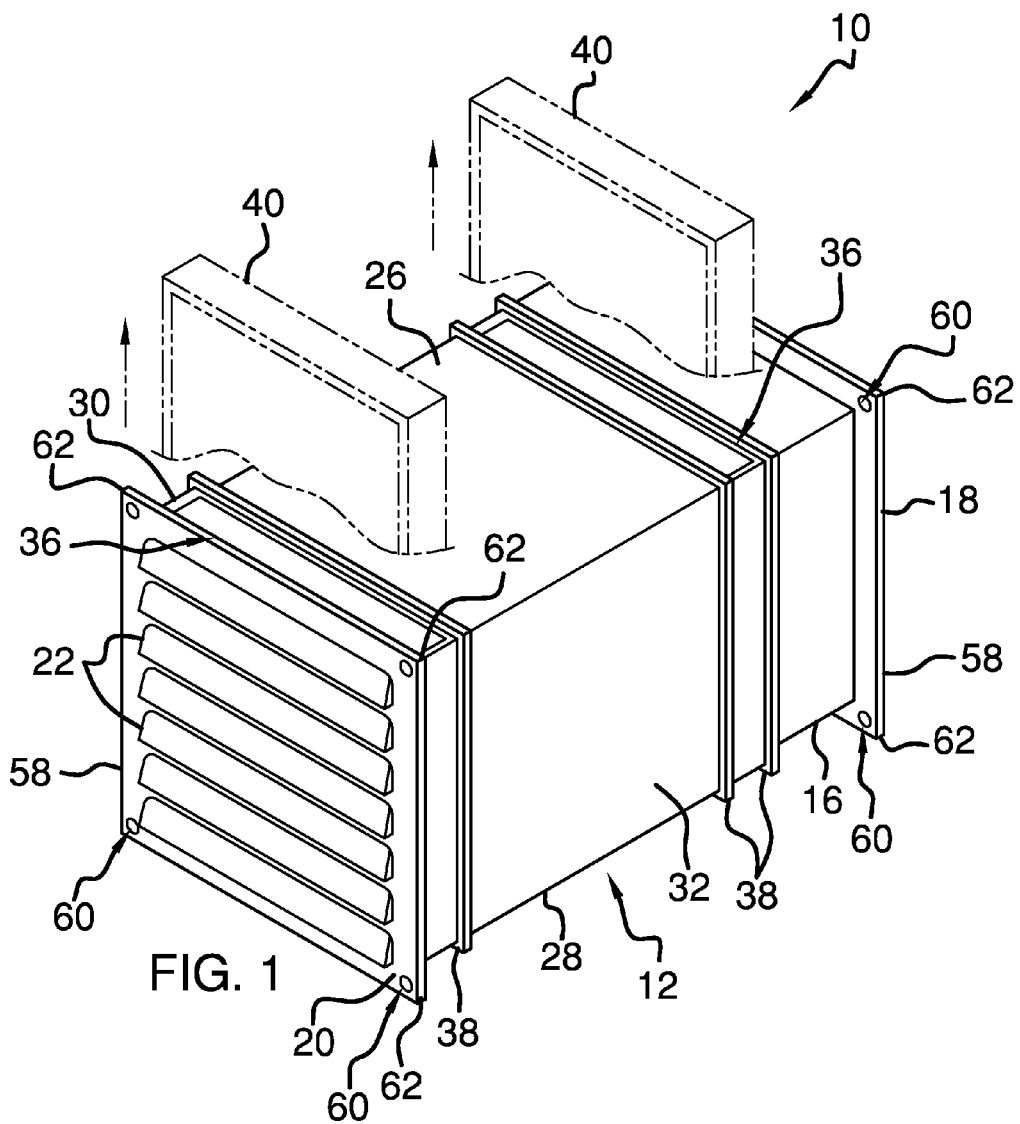
FIG. 1 is a top perspective view of a environmental air filtration assembly according to an embodiment of the disclosure.
Figure 2:
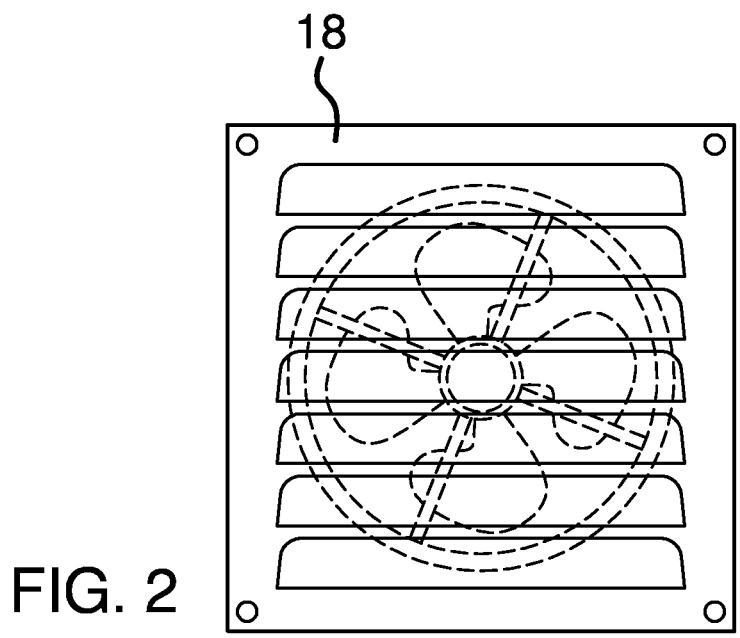
FIG. 2 is a back view of an embodiment of the disclosure.
Figure 3:
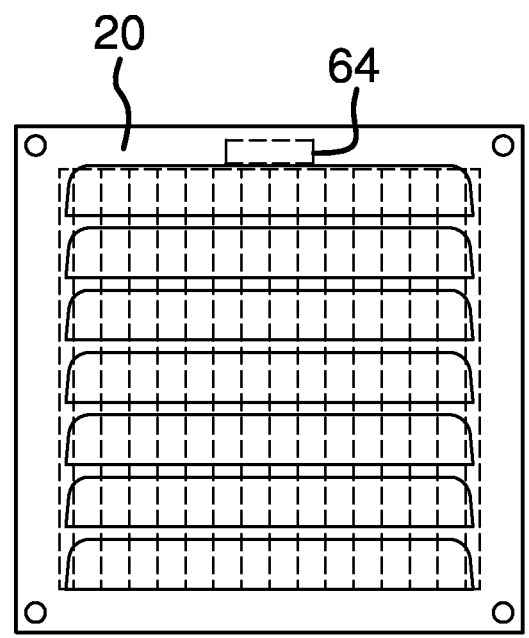
FIG. 3 is a front view of an embodiment of the disclosure.
Figure 4:
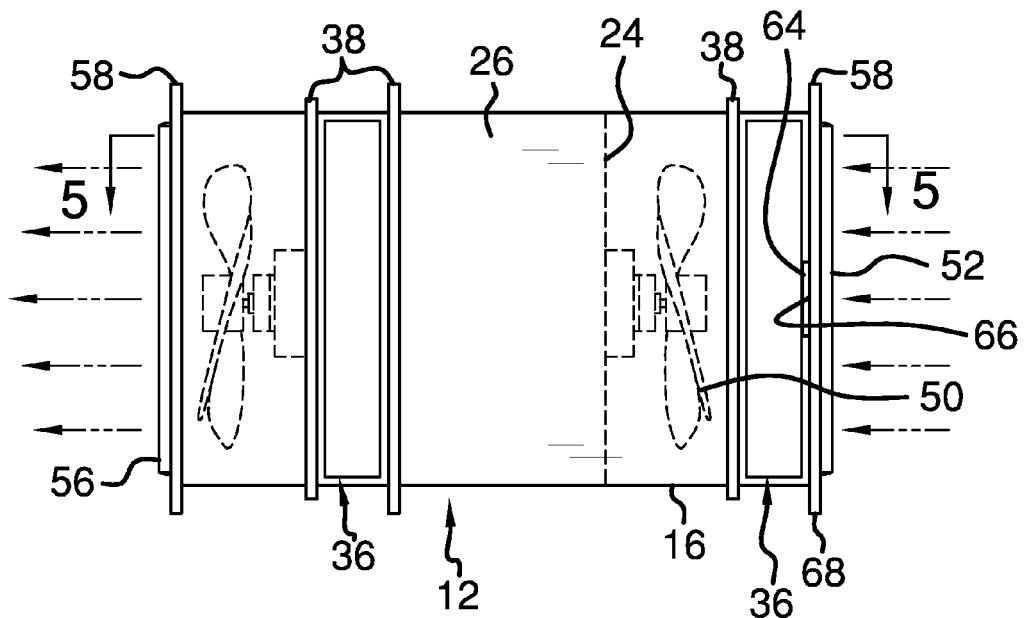
FIG. 4 is a right view of an embodiment of the disclosure.
Figure 5:
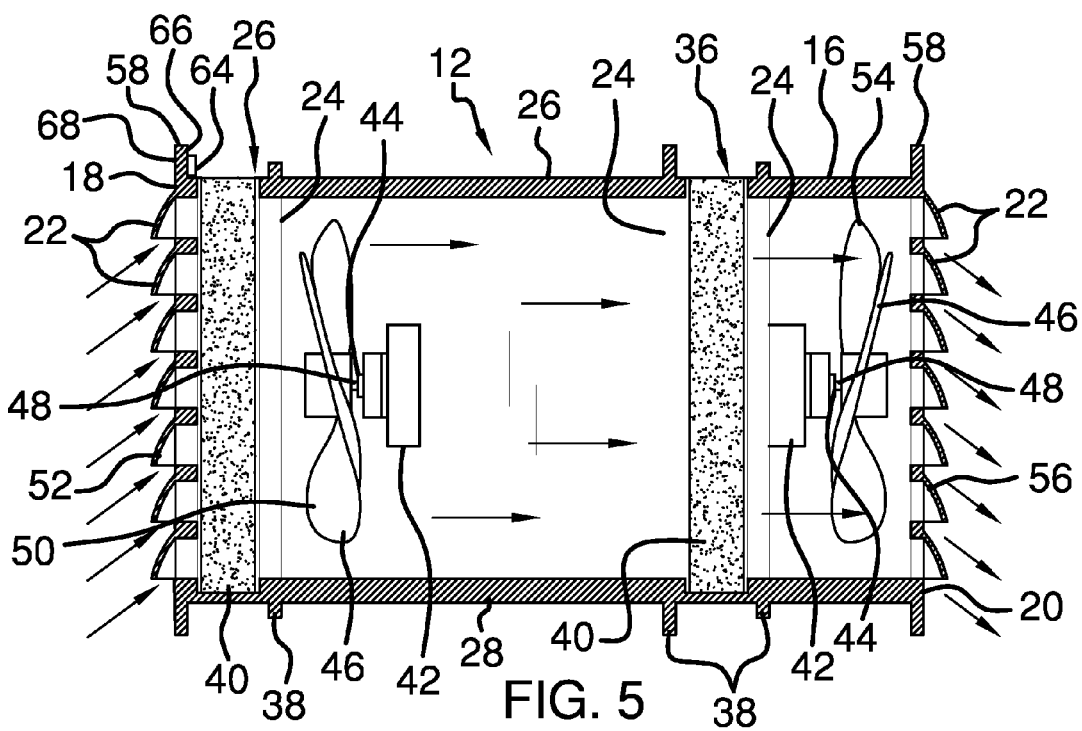
FIG. 5 is a cross sectional view taken along line 5-5 of FIG. 4 of an embodiment of the disclosure.
Figure 6:
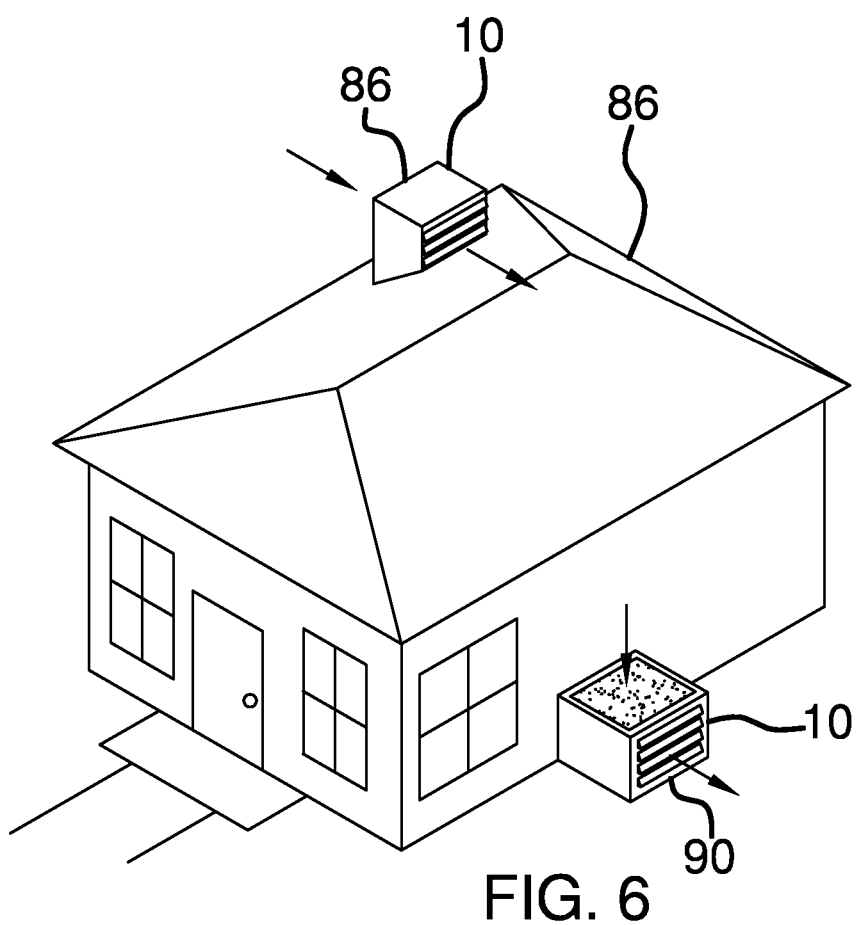
FIG. 6 is an in-use view of a alternative embodiment of the disclosure in residential building.
Figure 7:
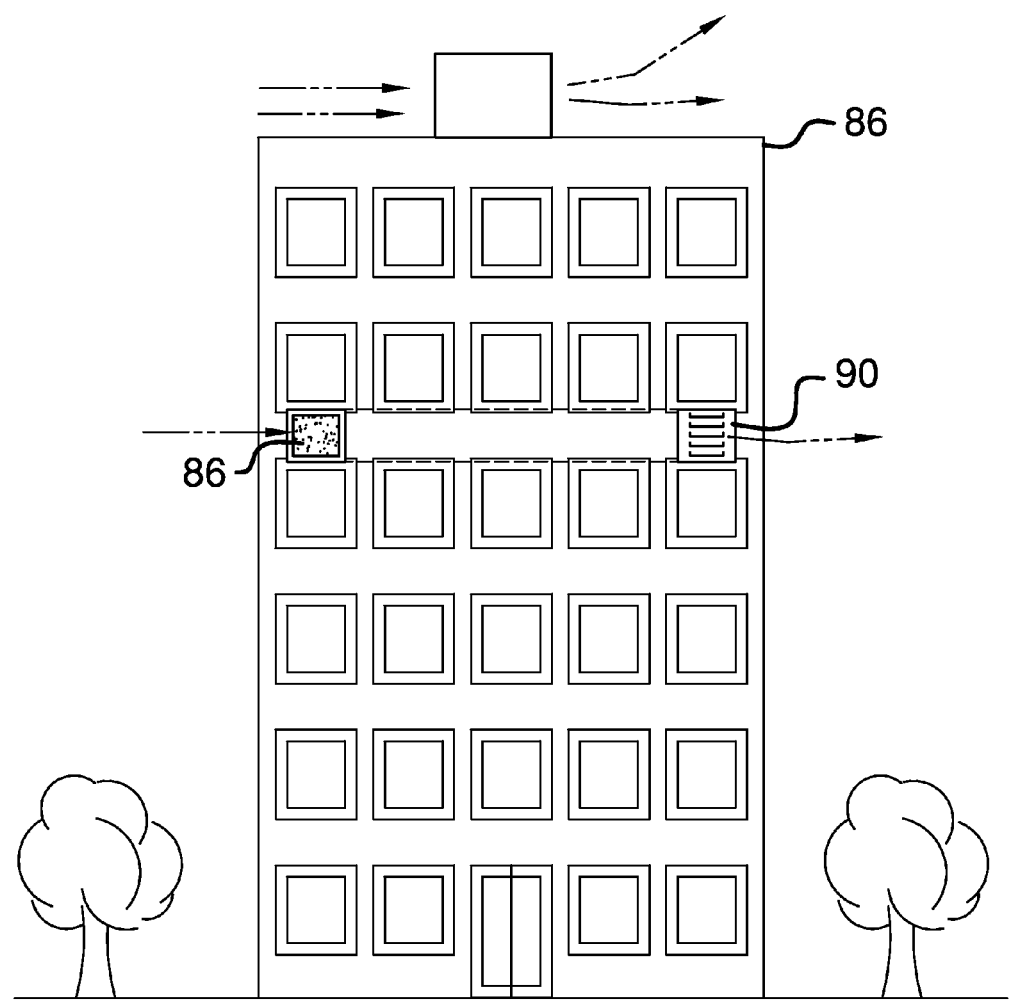
FIG. 7 is an in-use view of an alternative embodiment of the disclosure in commercial building.
Figure 8:
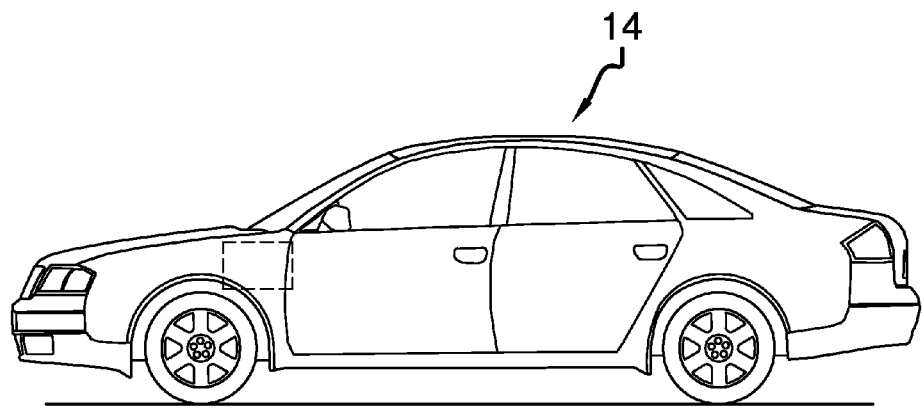
FIG. 8 is an in-use view of an embodiment of the disclosure in the vehicle.
Figure 9:
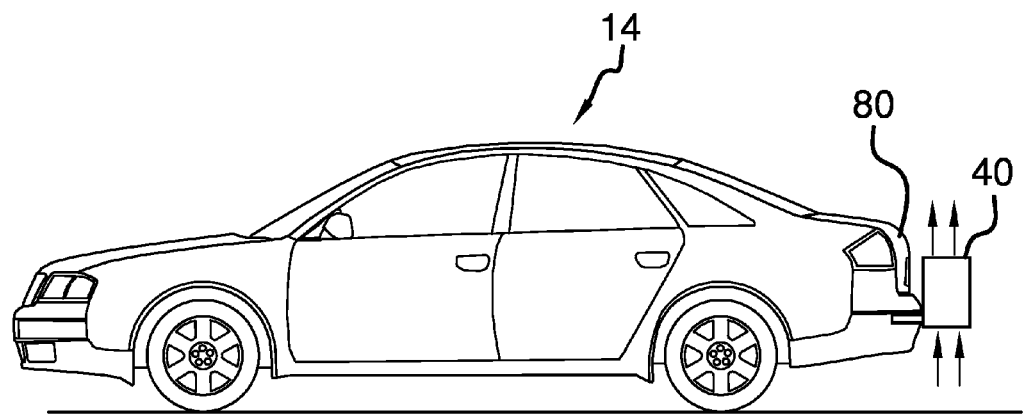
FIG. 9 is an in-use view of an embodiment of the disclosure on the rear of the vehicle.
Figure 10:
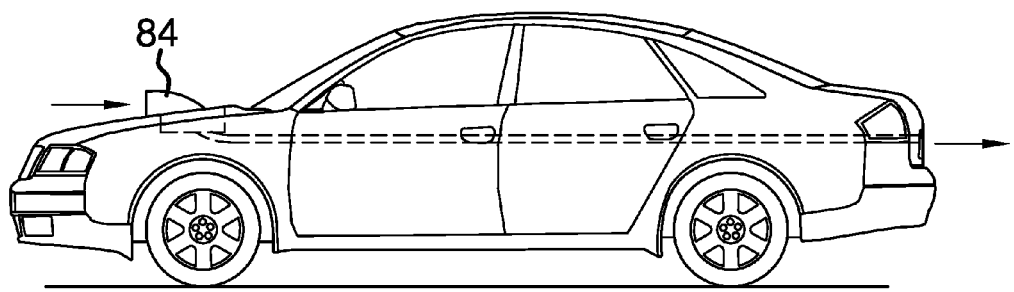
FIG. 10 is an in-use view of an embodiment of the disclosure on the hood scoop of the vehicle.
Figure 11:
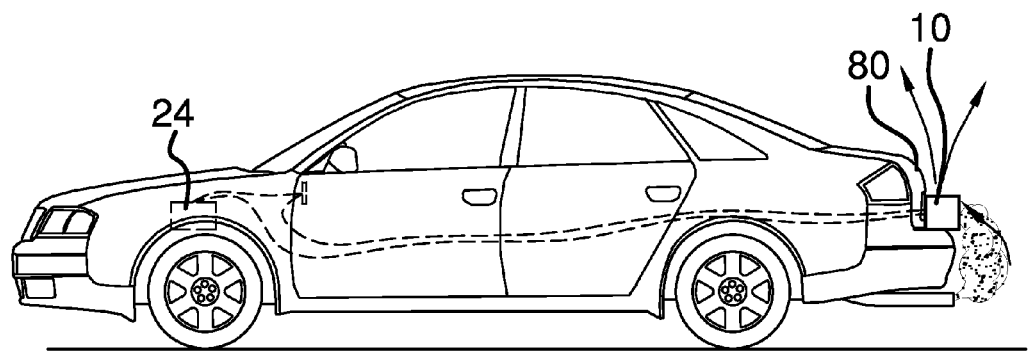
FIG. 11 is an in-use view of an embodiment of the disclosure showing the assembly filtering the vehicle exhaust.
Figure 12:
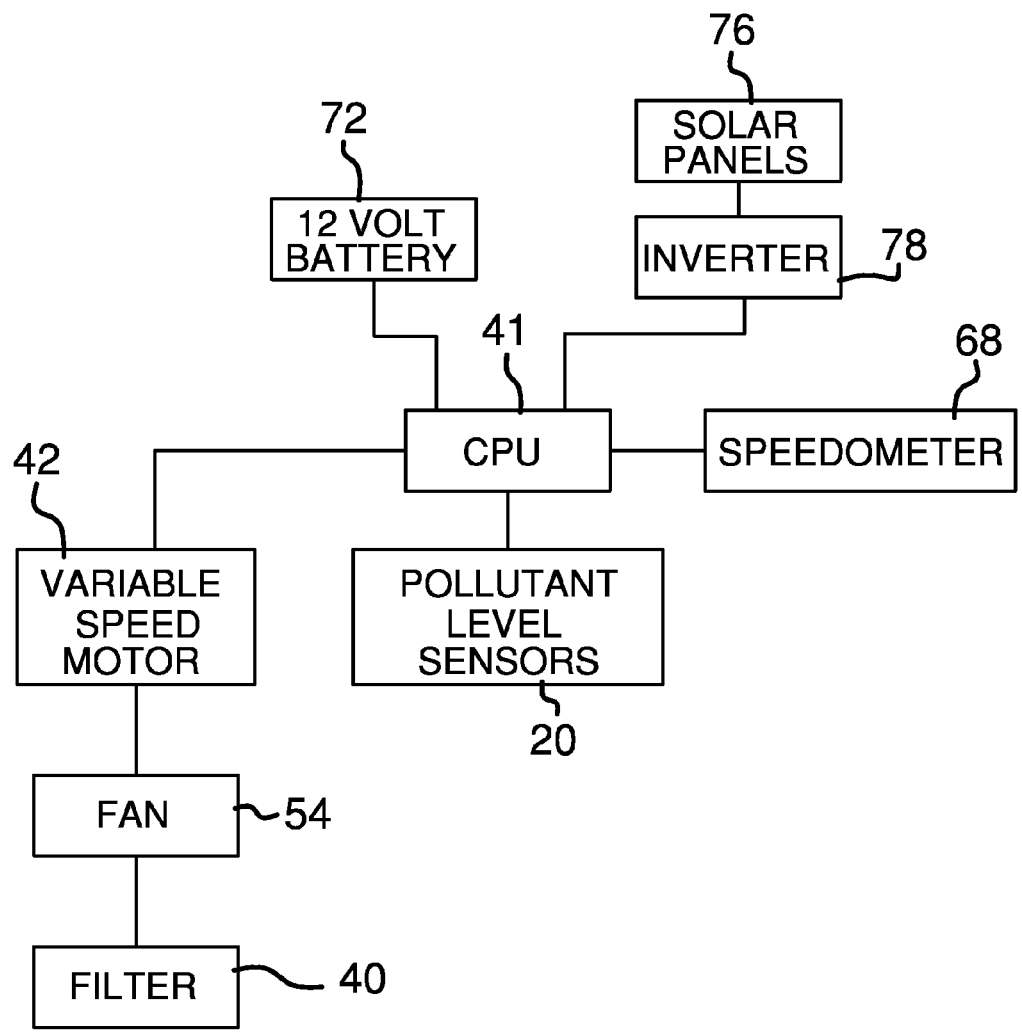
FIG. 12 is a schematic view of an embodiment of the disclosure.

As best illustrated in FIGS. 1 through 12, the environmental air filtration assembly 10 generally comprises a housing 12 that may be coupled to a vehicle 14 so the housing 12 is exposed to ambient air. The vehicle 14 may be an automobile of any conventional design. An outer wall 16 of the housing 12 has a width that is similar to a height of the outer wall 16 of the housing 12. Moreover, the housing 12 has a rectangular parallelepiped shape.

Each of a back side 18 and a front side 20 of the outer wall 16 of the housing has an associated one of a pair of vents 22 extending therethrough. The housing 12 has a pair of medial walls 24 extending between each of a top side 26, a bottom side 28, a first lateral side 30, and a second lateral side 32 of the outer wall 16 of the housing 12. Each of the pair of medial walls 24 is spaced apart and positioned proximate an associated one of the front 20 and back 18 sides of the outer wall 16 of the housing 12. Additionally, each of the pair of medial walls 24 has a centrally positioned fan opening 34 extending therethrough.

The top side 26 of the outer wall 16 the housing 12 has a pair of filter slots 36 extending therethrough. The pair of filter slots 36 extends between the first 30 and second 32 lateral sides of the outer wall 16 of the housing 12. Each of the pair of filter slots 36 is positioned proximate an associated one of the pair of medial walls 24 of the housing 12.

A plurality of lip 38 is each coupled to and extends outwardly from the top side 26, the bottom side 28, the first lateral side 30 and the second lateral side 32 of the outer wall 16 of the housing 12. Moreover, the plurality of lips 38 are positioned proximate each of associated one the pair of filter slots 36.

Each of a pair of filters 40 is removably inserted into an associated one of the pair of filter slots 36. The pair of filters 40 completely covers the fan opening 34 in an associated one of the pair of medial walls 24 of the housing 12. Additionally, the pair of filters 40 removes pollutants from the air. Finally, the pair of filters 40 may each be a particulate filter of any conventional design.

A processor 41 is coupled to the housing. The processor 41 may be an electronic processor of any conventional design. Each of a pair of motors 42 is coupled to an associated one of the pair of medial walls 24 of the housing 12. A pair of shafts 44 each rotatably coupled to an associated one of the pair of motors 42. Each of a pair of fans 46 is coupled to a free end 48 of an associated one of the pair of shafts 44. The pair of fans 46 is rotatably coupled to an associated one of the pair of motors 42.

A first one of the pair of fans 50 urges ambient air inwardly through a first one of the pair of vents 52. A second one of the pair of fans 54 urges ambient air outwardly through a second one of the pair of vents 56. The pair of fans 46 urges the ambient air through an associated one of the pair of filters 40.

A pair of fan flanges 58 is coupled to an associated one of the front 18 and back sides 20 of the outer wall 16 of the housing 12. Further, the pair of fan flanges 58 each extends outwardly from each of the top 26, bottom 28, first lateral 30 and second lateral side 32 of the outer wall 16 of the housing 12. A plurality of fastener apetures 60 extends through each of the pair of the fan flanges 58. Each of the plurality of fastener apertures 60 is postioned proximate an associated one of four corners 62 of associated one of the pair of fan flanges 58.

A speed sensor 64 is coupled to a back side 66 of a first one of the pair of filter flanges 68. The speed sensor 64 is electrically coupled between the processor 41 and each of the pair of motors 42. Additionally, the speed sensor 64 is electrically coupled to the vehicle 14 electrical system so the sensor 64 detects a speed of the vehicle 14. The speed sensor 64 modifies a speed of each of the pair of motors 42 to correspond to the speed of the vehicle 14. The speed sensor 64 increases a speed of each of the pair of motors 42 when the vehicle 14 approaches a minimum speed. Additionally, the speed sensor 64 decreases a speed of each of the pair of motors 42 as the vehicle 14 approaches a maximum speed.

A pollutant sensor 70 is coupled to the housing 12. The pollutant sensor 70 is electrically coupled between the processor 41 and each of the pair of motors 42. The pollutant sensor 70 detects a level of pollution in the air. Moreover, the pollutant sensor 70 de-actuates the pair of motors 42 when the pollutant sensor 70 detects a minimum amount of pollution. The pollutant sensor 70 actuates the pair of motors 42 when the pollutant sensor 70 detects a maximum amount of pollution.

A power supply 72 is coupled to the housing 12. The power supply 72 is electrically coupled to the speed sensor and the pollutant sensor 70. Moreover, the power supply 72 is electrically coupled to the vehicle electrical system 74. Finally, the power supply 72 may have an operational voltage between 9 VDC and 12 VDC.

A solar panel 76 is coupled to the housing 12. An inverter 78 is coupled to the housing 12. The solar panel 76 is electrically coupled to the inverter 78. Moreover, the inverter 78 is electrically coupled to the processor 41. The solar panel 76 may be a solar panel of any conventional design.

Additionally, the inverter 78 may be a DC inverter of any conventional design. The solar panel 76 provides an electrical current to the pair of motors 42 when the vehicle electrical system 74 is not active.

The assembly 10 may be coupled to a rear 80 of the vehicle 14. The assembly 10 filters exhaust 82 from the vehicle 14 to prevent the vehicle 14 from releasing pollutants into the atmosphere. The assembly 10 may be fluidly coupled to a hood scoop 84 of the vehicle 14. Additionally, the assembly 10 filters air while the vehicle 14 is in motion.

Alternatively, a pair of the assemblies 10 may be coupled to a building 86. The building 86 may be residential or commercial structure of any conventional design. Additionally, the power supply 72 in each of the pair of assemblies 10 may be coupled to the building 86 electrical system. A first one of the pair of assemblies 88 may urge the ambient air into the building 86. Lastly, a second one of the pair of assemblies 90 may urge the ambient air out of the building 86.

In use, the pair of motors 42 are actuated when the vehicle 14 is operated. The pair of filters 40 filters the ambient air so the pollutants are removed from the ambient air while the vehicle 14 is operated. Continuing, the pair of filters 40 are replaced at pre-determined intervals of time. Finally, a plurality of assemblies 10 may be coupled to the vehicle 14.

With respect to the above description, it is to be realized that the optimum dimensional relationship for the various components of the environmental air filtration assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the environmental air filtration assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An environmental air filtration assembly configured to be coupled to a vehicle, said assembly comprising:
   a housing configured to be coupled to the vehicle;
   wherein said housing is exposed to ambient air;
   a pair of filters coupled to said housing; wherein said pair of filters removes pollutants from the ambient air;
   a processor coupled to said housing;
   a pair of motors coupled to said housing, said pair of motors being operationally coupled to said processor;
   a pair of fans each operationally coupled to an associated one of said pairs of motors; wherein said pair of motors moves said pair of fans; wherein said pair of fans urges the ambient air through said pair of filters;
   a sensor coupled to said housing, said sensor being operationally coupled to said processor, said sensor detecting a speed of the vehicle; wherein said sensor modifies a speed of said pair of motors to correspond to the speed of the vehicle.

2. The assembly according to claim 1 wherein an outer wall of said housing having a length being greater than a width of said outer wall of said housing; wherein said housing has a rectangular parallelepiped shape.

3. The assembly according to claim 1 wherein each of a back side and a front side of an outer wall of said housing having an associated one of a pair of vents extending therethrough.

4. The assembly according to claim 1 wherein:
said housing having a pair of medial walls extending between each of a top side, a bottom side, a first lateral side, and a second lateral side of an outer wall of said housing; and
each of said pair of medial walls being spaced apart and positioned proximate an associated one of a front side and a back side of said outer wall of said housing.

5. The assembly according to claim 4 wherein each of said pair of medial walls having a centrally positioned fan opening extending therethrough.

6. The assembly according to claim 1 wherein a top side of an outer wall of said housing having a pair of filter slots extending therethrough; wherein said pair of filter slots extends between a first lateral side and a second lateral side of said outer wall of said housing.

7. The assembly according to claim 6, further comprising each of said pair of filter slots being positioned proximate an associated one of a pair of medial walls of said housing.

8. The assembly according to claim 1 wherein each of said pair of filters being removably inserted into an associated one of a pair of filter slots; wherein said pair of filters completely covers a fan opening in an associated one of a pair of medial walls of said housing.

9. The assembly according to claim 1 wherein each of said pair of motors being coupled to an associated one of a pair of medial walls of said housing.

10. The assembly according to claim 1 wherein a pair of shafts each rotatably coupled to an associated one of said pair of motors.

11. The assembly according to claim 1 wherein each of said pair of fans being coupled to a free end of an associated one of a pair of shafts; wherein said pair of fans is rotatably coupled to an associated one of said pair of motors.

12. The assembly according to claim 1 wherein said processor being electrically coupled between said sensor and each of said pair of motors.

13. The assembly according to claim 1 wherein a power supply coupled to said housing.

14. The assembly according to claim 13 wherein said power supply being electrically coupled between said processor and said sensor.

15. The assembly according to claim 14 wherein said power supply being electrically coupled to the vehicle power source.

16. An environmental air filtration assembly configured to be coupled to a building, said assembly comprising:
a housing, an outer wall of said housing having a length being greater than a width of said outer wall of said housing; wherein said housing has a rectangular parallelepiped shape, said housing being configured to be coupled to the building; wherein said housing is exposed to ambient air;
a filter coupled to said housing; wherein said filter removes pollutants from the ambient air;
a processor is coupled to the housing;
a pair of motors coupled to said housing, said pair of motors being operationally coupled to said processor;
a pair of fans operationally coupled to an associated one of said pairs of motors; wherein said pair of motors moves said pair of fans; wherein said pair of fans urges the ambient air through said pair of filters; and
a sensor coupled to said housing, said sensor being operationally coupled to said processor;
wherein said sensor is being used to detect ambient air movement when said assembly is configured for use with said building.

17. The assembly according to claim 16 wherein each of said back and front sides of said outer wall of said housing having an associated one of a pair of vents extending therethrough; said housing having a pair of medial walls extending between each of a top side, a bottom side, a first lateral side, and a second lateral side of said outer wall of said housing; each of said pair of medial walls being spaced apart and positioned proximate an associated one of said front and back sides of said outer wall of said housing; each of said pair of medial walls having a centrally positioned fan opening extending therethrough.

18. The assembly according to claim 16 wherein a top side of said outer wall said housing having a pair of filter slots extending therethrough wherein said pair of filter slots extends between a first lateral side and a second lateral side of said outer wall of said housing; each of said pair of filter slots being positioned proximate an associated one of a pair of medial walls of said housing; each of said pair of filters being removably inserted into an associated one of said pair of filter slots wherein said pair of filters completely covers a fan opening in an associated one of a pair of medial walls of said housing.

19. The assembly according to claim 16 wherein each of said pair of motors being coupled to an associated one of a pair of medial walls of said housing; a pair of shafts each rotatably coupled to an associated one of said pair of motors; each of said pair of fans being coupled to a free end of an associated one of said pair of shafts; wherein said pair of fans is rotatably coupled to an associated one of said pair of motors.

20. The assembly according to claim 16 wherein said sensor being electrically coupled between said processor and each of said pair of motors; a power supply coupled to said housing; said power supply being electrically coupled between said processor and said sensor.

\* \* \* \* \*